Aug. 17, 1954 M. S. GOTTLIEB 2,686,834
TOY TELEPHONE SYSTEM
Filed July 20, 1953
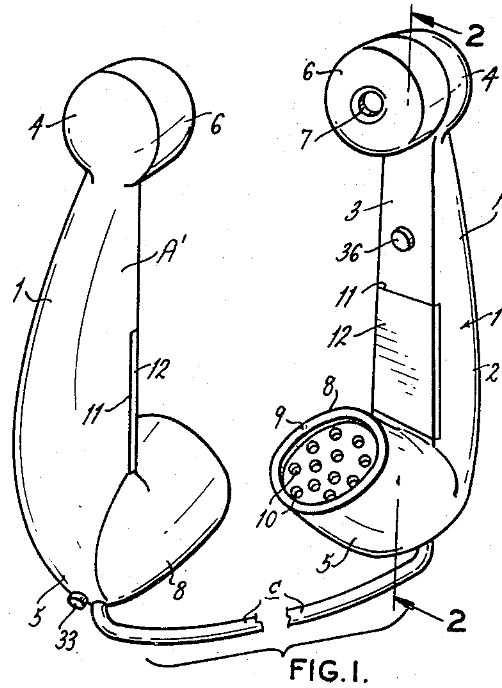
FIG. 1.
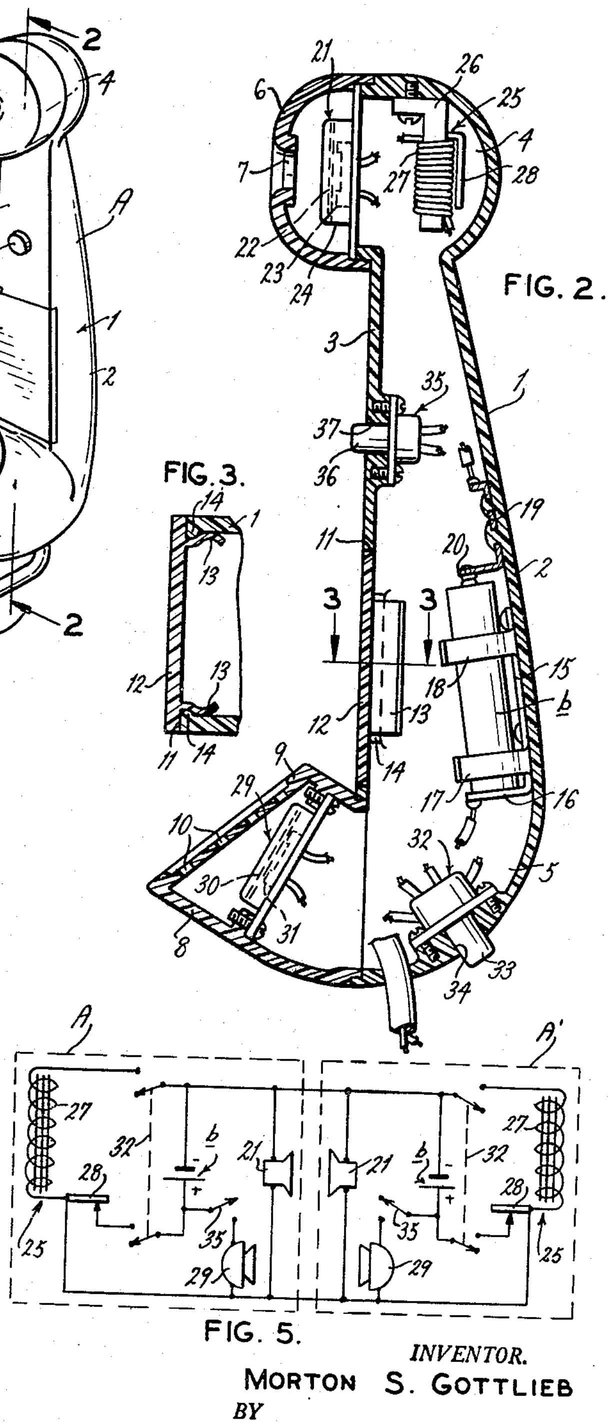
FIG. 2. FIG. 3.
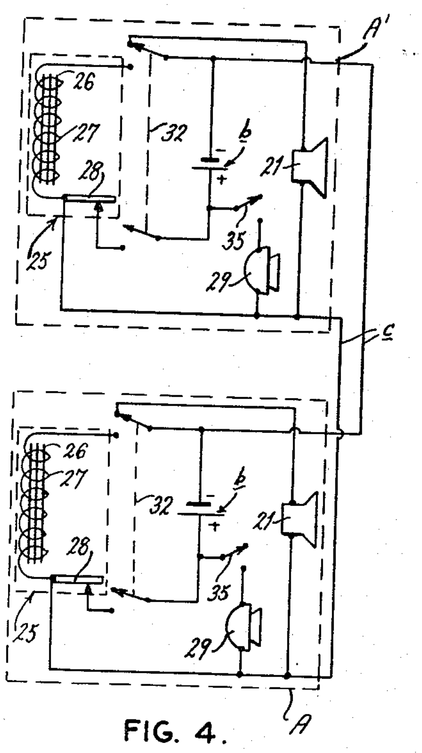
FIG. 4.
FIG. 5.
INVENTOR.
MORTON S. GOTTLIEB
BY
Alfred W. Petchaft
ATTORNEY Patented Aug. 17, 1954

2,686,834

UNITED STATES PATENT OFFICE 2,686,834

TOY TELEPHONE SYSTEM

Morton S. Gottlieb, University City, Mo., assignor to Jay V. Zimmerman Company, St. Louis, Mo., a corporation of Missouri Application July 20, 1953, Serial No. 368,896

4 Claims. (Cl. 179—1)

This invention relates in general to certain new and useful improvements in toy telephone systems and more particularly to an intercommunicating toy telephone set.

In manufacturing toy telephones for children, it is desirable to provide a pair of wire-connected handsets by which two children can talk to each other over a substantial distance. In addition, it is desirable to permit the children to signal each other when ready to conduct a conversation, so as to stimulate the functioning of a telephone system used by adults. Since toy telephone sets might be light in weight, inexpensive to manufacture, and simple to operate, it becomes extremely desirable to employ a minimum number of components and the simplest form of interconnection system. Such toy telephones, furthermore, must be operated by small flashlight batteries or similar power sources, and therefore cannot function effectively where the resistance of the interconnecting line will have an appreciable effect.

It is, of course, conventional in the telephone art to provide telephone handsets having bells, buzzers, and other audible signaling means and to connect such audible signaling means by independently wired circuits for purposes of ringing the user when another person is endeavoring to call on the telephone. It has thus far not been considered possible, however, to employ a simple two-wire system, which incorporates an audible signaling means utilizing standard components of the telephone handset and capable of being operated with a low voltage direct current power source, such as a single flashlight cell.

It is the primary object of the present invention, therefore, to provide a pair of telephone handsets having audible signaling means and being connected in sets by a simple two wire conductor.

It is another object of the present invention to provide a pair of wire-connected toy telephones which are simple and economical in construction and can be readily used by small children in substantial simulation of telephones used by adults.

It is another object of the present invention to provide a toy telephone set which is rugged and durable and simulates in appearance the conventional type of telephone handset which is currently in commercial use.

With the above and other objects in view, my invention resides in the novel features of form, construction, arrangement, and combination of parts presently described and pointed out in the claims.

In the accompanying drawings—

Figure 1 is a perspective view of a pair of toy telephone handset constructed in accordance with and embodying the present invention;

Figure 2 is a longitudinal sectional view of the telephone handset taken along line 2—2 of Figure 1;

Figure 3 is a fragmentary transverse sectional view taken along line 3—3 of Figure 2;

Figure 4 is a schematic wiring diagram showing the electrical connections constituting one form of circuit embodying the present invention; and Figure 5 is a schematic wiring diagram of a modified form of circuit embodying the present invention.

Referring now in more detail and by reference characters to the drawings which illustrate practical embodiment of the present invention, A, A′ designate two telephone handsets which are identical and are connected by a length of two wire conductor *c* to form a toy telephone system which can be utilized by two children for intercommunication with each other. The conductor can have a length up to 150 or possibly 200 feet, without materially reducing the effectiveness or audibility of the signals therebetween.

The telephone handset A comprises a hollow elongated handle 1 molded preferably from Bakelite or any other synthetic plastomer and integrally includes an arcuate back wall 2, a flat front wall 3, and enlarged somewhat spherical earpiece and mouthpiece portions 4, 5, respectively. The earpiece portion 4 is provided with a cap 6 having a centrally provided opening 7, through which sound may readily travel, and similarly, the mouthpiece portion 5 is provided with a cap 8, having an angularly inclined or oblique front wall 9, a substantial portion of which is provided with perforations 10, also arranged to permit the free travel of sound therethrough. The front wall 3 of the handle 1 is provided with a rectilinear opening 11 adapted for snugly receiving a flat cover plate 12, the latter being provided upon its interior face with a pair of inwardly presented resilient prongs 13 contoured for engagement with inwardly presented marginal bosses 14, formed on the interior of the handle 1. The cover plate 12 is thus manually removable at will to permit access to the interior of the handle as best seen in Figure 3, for purposes more fully appearing.

Riveted or otherwise suitably attached upon the interior face of the back wall 2 is a metallic battery-retaining plate 15, having an upstanding contact flange 16 and longitudinally spaced pairs of battery-engaging clips 17, 18. Also riveted or otherwise rigidly secured upon the innerface of the back wall 2 in outwardly spaced relation to the clip 15 is a contact member 19, having upstanding terminal flange 20. Removably inserted into the clips 17, 18 is a small dry-cell battery *b* with its one terminal in contact with the flange 16 and its other terminal in contact with the member 19. The battery *b* can, of course, be reached for replacement by removal of the cover plate 12.

Suitably mounted within the earpiece 4 in rearwardly spaced proximate relation to the opening 7 of the cap 6 in a conventional telephonic receiver element 21 is an electromagnetic vibrator or interrupter 25, consisting of a laminated pole piece or core 26 provided with a winding 27 and an armature 28.

Similarly mounted in the cap 8 is a substantially conventional telephonic transmitter element or microphone 29, including a sound-responsive diaphragm 30 and compressible carbon-particle capsule 31. Also rigidly mounted in the lower end or mouthpiece portion 5 of the handle 1 is a spring-biased double pole single throw push button switch 32, having a manually actuable push button 33 which projects outwardly through an aperture 34 in the lower portion of the back wall 2. Similarly mounted upon the innerface of the front wall 3 of the handle 1 is a spring-biased single pole single throw push button switch 35, having an outwardly projecting push button 36 extending through an aperture 37.

The receiver element 21, the transmitter element 29, the interrupter 25, the battery *b*, and the push button switches 32, 35 are connected in the manner shown in Figure 4. As will be seen, the switches 32 and 35 are normally spring-biased to "off" or open position. When the user of telephone handset A′ desires to call or attract the attention of the user of telephone handset A, he presses the push button 33 of the switch 32, thereby closing the contact between the battery *b* and the interrupter 25 of the telephone handset A′. As soon as the interrupter 25 is thus energized, it begins a rapid series of makes and breaks, thereby generating a high frequency impulse which is transmitted through the conductors *c* to the receiver element 21 of the telephone handset A, causing the latter to vibrate responsively and create a very rapid clicking sound which has a close audible similarity to the noise produced by a conventional buzzer. As soon as the user of the telephone handset A hears the buzz-like sound in his handset A, he knows that his playfellow is trying to call him on his telephone, and thereupon manually presses the pushbutton 36 down closing the circuit to his own transmitter element 29, so that he can speak into it and acknowledge his readiness to receive a message by saying the usual, "Hello" or any other conventional signal or greeting. Of course, the first caller will press the push button 33 of his instrument several times in quick succession or hold it depressed for a few seconds and then release it to listen for a response and then will hear the "Hello" or other greeting from the user of handset A and can listen to the message coming into his receiver element 21. He can reply thereto by pressing the push button 36 of his own telephone handset A′ and return the message or make any other verbal statement which he chooses to make. As long as the two users of the telephone handsets A, A′ keep the pushbutton 36 thereof respectively depressed, a two-way conversation can be conducted in exactly the same manner as can be carried on by two adults using a commercial type of telephone. It should be noted in this connection that the polarities of the two batteries are so arranged that they oppose each other, and therefore the battery of the telephone handset A′, in effect, becomes the power source for the circuit between the transmitter 29 thereof and the receiver element 21 of the telephone handset A. Similarly, the battery *b* of the telephone handset A becomes the power source for the transmitter element 29, thereof, and the receiver element 21 of the telephone handset A′. The two batteries *b*, *b*, by virtue of the opposition of their polarities, do not drain each other to any appreciable or noticeable degree and it has been found in actual practice that these batteries will operate for substantially their normal life.

If desired, the telephone handsets A, A′ may be connected in a modified manner as shown in Figure 5. In this form of the invention, the receiver elements 21 are connected in tandem and the user of the handset A can hear the same signals as the user of the handset A′. The buzzing signal will, of course, be audible in both receiver elements 21, but the voice signal will override the buzzing signal so that the buzzing actuation of the pushbutton 33 can be stopped when the answering voice signal comes through. The common connection of the two receiver elements 21 obviates the possibility that one of the two receiver elements 21 might not, on occasion, work properly due to inefficient contact-making operation of the pushbutton switch 35. Since the device is primarily a toy and will receive much abuse, there is a possibility that the switch 35 may at times malfunction, and by sacrificing the independence of the receiver elements 21, it is possible to effect a permanent connection obviating the danger that the switch may malfunction.

It should be understood that changes and modifications in the form, construction, arrangement, and combination of the several parts of the toy telephone system may be made and substituted for those herein shown and described without departing from the nature and principle of my invention.

Having thus described my invention, what I claim and desire to secure by Letters Patent is:

1. An intercommunication system including two telephonic units each comprising a voice transmitter having two terminals, a voice receiver having two terminals, a vibrator having two coil-terminals and an armature-terminal and a power source having positive and negative terminals, one coil-terminal, one terminal of the transmitter and one terminal of the receiver being connected in common to each other, a first switching-contactor being optionally shiftable into circuit-closing engagement with one or the other of two contact-points, one contact-point of the first switching contactor being connected to the other coil-terminal and the other associated contact-point being connected to the other terminal of the voice-receiver, said first switching-contactor being connected to one terminal of the power source, a second switching-contactor having one contact-point connected to the armature-terminal, said second switching-contactor being connected to the other terminal of the power source, a third switching-contactor having one contact-point connected to the other terminal of the voice transmitter said third switching-contactor being connected to the terminal of the power source which is connected to the second switching-contactor, and a two-wire conductor one wire of which is connected at its opposite ends to the first switching-contactor of each telephonic unit respectively, the other wire being connected at its opposite ends to the common connections between the receiver and transmitter of each telephonic unit respectively.

2. An intercommunication circuit including two identical telephonic units adapted to be connected by a conductor having two wires, each unit comprising a vibrator adapted, upon being energized, to emit transients, a transmitter, a receiver and a battery, said receiver, transmitter and vibrator each having one terminal connected in common to one wire of the conductor, one terminal of the battery and the other terminal of the receiver being connected in common to the other wire of the conductor, manually actuable first switch means for optionally connecting the other terminal of the battery to the other terminal of the transmitter, so that when said switch means in each unit is actuated, the transmitter and receiver of one unit will thereby be connected in voice-transmission circuit with the transmitter and receiver of the other unit, and a second switch means in each unit for optionally connecting the battery of such unit across the vibrator thereof and also connecting said vibrator across the wires of the conductor so that the vibrator becomes energized and the transients emitted thereby are transmitted to the receiver of the other unit for creating a calling signal therein.

3. An intercommunication circuit including two identical telephonic units adapted to be connected by a two-wire conductor, each unit comprising a transmitter, a receiver having one terminal permanently connected to the transmitter and to one wire of the two-wire conductor, said receiver having its other terminal permanently connected to the other wire of the conductor, a battery, a normally open talk-switch adapted, upon closure, to connect the transmitter to one terminal of the battery so that the transmitter and receiver of one unit are in circuit with the transmitter and receiver of the other unit when the talk-switches of the two units are closed, a vibrator adapted, upon energization, to emit transients, said vibrator including an armature having one terminal and a coil having one terminal, said armature and coil further having one common terminal which latter terminal is permanently connected to the permanent connection between the transmitter and receiver and a manually actuable call-switch having two contactors mechanically connected for simultaneous movement, the contactors being arranged so that upon actuation of the call-switch of one unit, the contactors of such unit will connect the battery thereof across the armature and the coil of the vibrator in such unit whereby to energize such vibrator and impose the transients emitted thereby upon the two-wire conductor for transmission to the receiver of the other unit causing the latter to emit an audible signal.

4. An intercommunication circuit including two identical telephonic units adapted to be connected by a conductor having two wires, each unit comprising a vibrator adapted, upon being energized, to emit transients, a transmitter, a receiver and a battery, said receiver, transmitter and vibrator each having one terminal connected in common to one wire of the conductor, one terminal of the battery and the other terminal of the receiver being connected in common to the other wire of the conductor, manually actuable first switch means for optionally connecting the other terminal of the battery to the other terminal of the transmitter, so that when said switch means in each unit is actuated, the transmitter and receiver of one unit will thereby be connected in voice-transmission circuit with the transmitter and receiver of the other unit, and a second switch means in each unit for optionally connecting the battery of such unit across the vibrator thereof and also connecting said vibrator across the wires of the conductor so that the vibrator becomes energized and the transients emitted thereby are transmitted to the receiver of the other unit for creating a calling signal therein, the negative sides of the batteries in each unit being connected to each other through one wire of the conductor, and the positive sides of the batteries in each unit being connected through the other wire of the conductor when either of the switches is closed.

References Cited in the file of this patent

UNITED STATES PATENTS

| Number | Name | Date |
|---|---|---|
| 534,359 | Clammond | Feb. 19, 1895 |
| 751,829 | Billig | Dec. 2, 1902 |
| 786,041 | Lind | Mar. 28, 1905 |
| 978,695 | Caughrean | Dec. 13, 1910 |
| 2,492,125 | Bailey et al. | Dec. 20, 1949 |
| 2,653,192 | Shipton | Sept. 22, 1953 |